Figure 1:
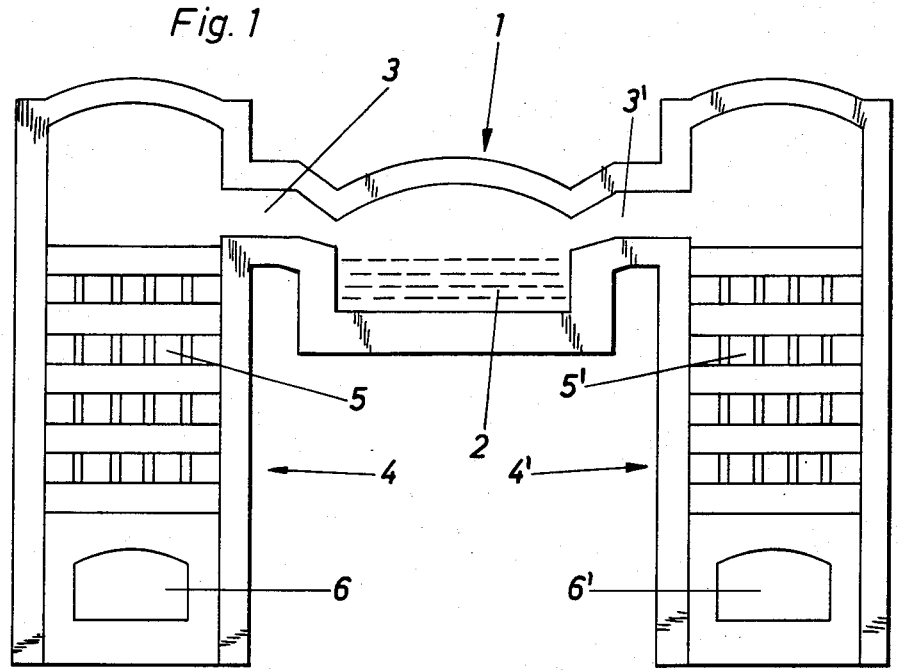

United States Patent [19]

Karl

[11] Patent Number: 4,540,039
[45] Date of Patent: Sep. 10, 1985

[54] PRISMATIC REFRACTORY BRICK FOR GLASS MELTING FURNACE CHAMBERS

[75] Inventor: Otto Karl, Vienna, Austria

[73] Assignee: Veitscher Magnesitwerke-actien-Gesellschaft, Vienna, Austria

[21] Appl. No.: 490,719

[22] Filed: May 2, 1983

[30] Foreign Application Priority Data

May 3, 1982 [AT] Austria .................................. 1723/82

[51] Int. Cl.³ .............................................. F28D 17/02
[52] U.S. Cl. ........................................ 165/9.4; 165/9.1
[58] Field of Search ............................ 165/9.1, 9.2, 9.4

[56] References Cited

FOREIGN PATENT DOCUMENTS

| 514073 | 9/1952 | Belgium | 165/9.2 |
| 2529372 | 1/1977 | Fed. Rep. of Germany | 165/9.1 |
| 667448 | 2/1952 | United Kingdom | 165/9.1 |

Primary Examiner—Albert W. Davis, Jr.
Attorney, Agent, or Firm—Kurt Kelman

[57] ABSTRACT

A prismatic brick of refractory material for the checker work in chambers of a glass melting furnace, the brick having an octagonal bottom surface, an octagonal top surface, a longitudinal axis extending between the surfaces, a through passage of tetragonal cross section between the surfaces and coaxial with the longitudinal axis, inner walls defining the through passage, outer walls between the surfaces, the walls being parallel to the longitudinal axis, the bottom and top surfaces extending along major axes, one of the surfaces having elevated portions and the other surface having corresponding depressed portions extending in the direction of the major axes, and a passage extending from the through passage to a respective one of the outer walls from at least one of the inner walls.

5 Claims, 4 Drawing Figures

PRISMATIC REFRACTORY BRICK FOR GLASS MELTING FURNACE CHAMBERS

The present invention relates to a prismatic brick of refractory material for the checker work in chambers of a glass melting furnace, the brick having an octagonal bottom surface, an octagonal top surface, a longitudinal axis extending between the surfaces, a through passage of tetragonal cross section between the surfaces and coaxial with the longitudinal axis, inner walls defining the through passage, outer walls between the surfaces, the walls being parallel to the longitudinal axis, the bottom and top surfaces extending along major axes, and one of the surfaces having elevated portions and the other surface having corresponding depressed portions extending in the direction of the major axes. The refractory material may be magnesite, magnesia chrome iron ore or chrome iron ore magnesia, forsterite or fireclay, for example.

Such bricks are known, for example, from U.S. patent application Ser. No. 346,225, filed Feb. 5, 1982, now U.S. Pat. No. 4,436,144 and have been successfully used because their shape makes it possible to construct a stable checker work in chambers of glass melting furnaces, the wall thickness of the hollow bricks being so reduced that practically the entire brick volume may serve to store heat. This is derived from the fact that the through passage has a hydraulic diameter of 120 to 200 mm, the hydraulic diameter being defined by the relationship: four times the through passage cross section divided by the periphery of the through passage cross section, and that the ratio of the hydraulic diameter to the thickness of the hollow brick, measured in the direction of the major axes extending parallel to the bottom and top surfaces, is between 3 and 5. For example, the brick thickness, i.e. the distance between the inner walls defining the through passage and the outer walls, may be 40 mm while prior art tetragonal bricks had to have a thickness of 60 mm or more to build a stable checker work, which made it impossible for the inner walls of the bricks to be warmed by the flue gases and thus to contribute to the heat storage.

An attempt was made to shape these hollow bricks so that a certain turbulence of the gases flowing through the checker work would be obtained and thus to improve the heat exchange. However, in the operation of glass melting furnaces whose chambers had checker works built with these bricks, it has been found that the glue gases as well as the fresh air pass in an essentially laminar flow through the through passages of the checker works, as is also the case with checker works built with tetragonal or cross-shaped bricks.

It is the primary object of this invention to provide a hollow refractory brick of the first-described type which assures a better heat exchange between the flue gases and the bricks and the bricks and the fresh air.

The above and other objects are accomplished according to the invention with such a brick which has a passage extending from the through passage to a respective one of the outer walls from at least one, preferably from all, of the inner walls. The passages are recesses in the other, preferably the bottom, surface of the brick.

These passages operate as expansion chambers creating a more effective turbulence in the flow of gases flowing through the through passages of the bricks of the checker work in glass melting furnace chambers. This leads to a more intimate contact of the gases with the bricks and considerably enhances the heat exchange between the gases and the bricks. Furthermore, there is an equilibrium between the gas flows in the individual through passages, particularly if all the bricks have passages leading from all four inner walls to the outer walls.

While these passages reduce the area of the inner walls defining the through passages of the bricks, the walls defining the passages extending perpendicularly to the through passages also contribute to the heat exchange so that, at most, only a small reduction in the heated surfaces of the bricks occurs. In this respect, it is advantageous if the product of the length of the line delimiting the passage and the distance between the inner and outer walls is at least equal to, or is larger than, the area of the passage. Preferably, the area of the passage is 0.2 to 0.6 times the area of a respective inner wall.

Figure 3:
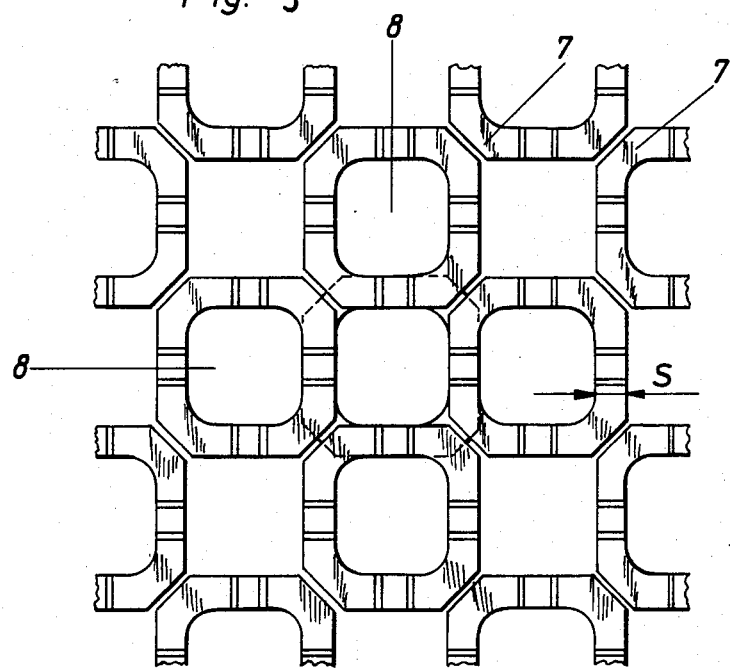
Figure 2:
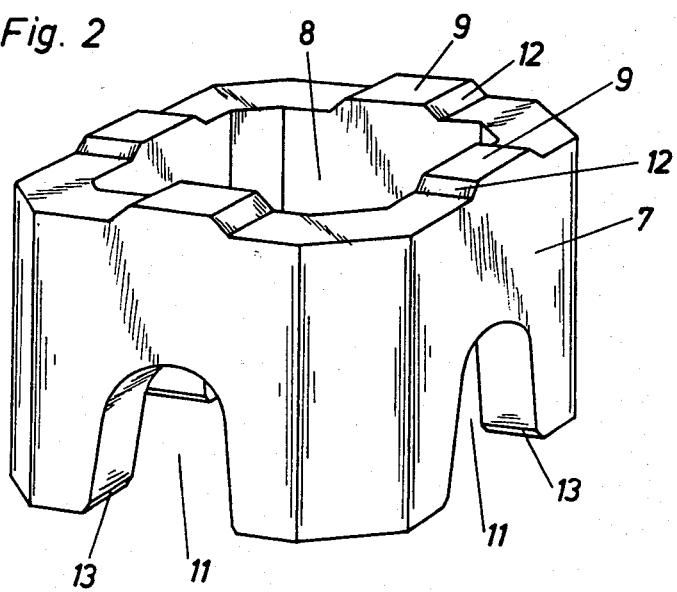
Figure 4:
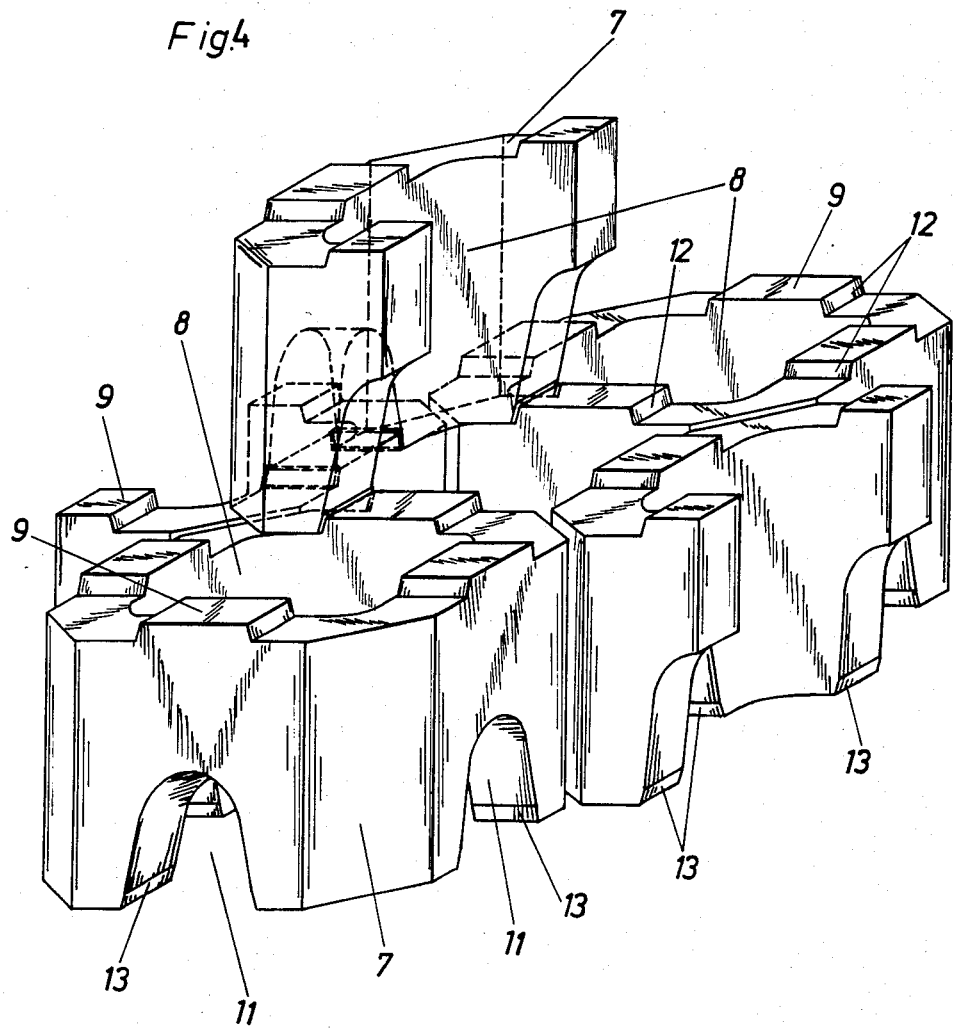

The above and other objects, advantages and features of the present invention will become more apparent from the following detailed description of certain now preferred embodiments thereof, taken in conjunction with the accompanying drawing wherein FIG. 1 is a diagrammatic elevational view of a glass melting furnace, with the side wall removed to see the interior, FIG. 2 is a perspective view showing an embodiment of hollow bricks, FIG. 3 is a plan view of one layer of a checker work built with the bricks of this invention in the glass melting furnace chambers of FIG. 1, and FIG. 4 is a perspective view of a part of the checker work.

Referring now to the drawing and first to FIG. 1, the illustrated glass melting furnace is shown to comprise trough 1 containing molten bath 2, the trough being clad with refractory material. Passages 3, 3' arranged at both sides of trough 1. Burners (not shown) are mounted in these passages which lead to chambers 4, 4' in each of which a respective checker work 5, 5' is arranged. Except for zones along the edges, each checker work is comprised of bricks of the same dimensions.

In the operation of the furnace, molten bath 2 in trough 1 is heated at one time by the burner mounted in passage 3', the flue or waste gases flowing through passage 3 into the chamber containing checker work 5 and heating the bricks of this checker work as they pass therethrough. When the bricks of checker work 5 have been heated sufficiently, the gas flow is switched over and molten bath 2 is heated by the burner in passage 3, the combustion air passing through opening 6 into chamber 4 and flowing through checker work 5 where it is heated by the hot bricks of the checker work. At the same time, the flue or waste gases flow through passage 3' into chamber 4', passing through checker work 5' and heating the bricks of this checker work before leaving the chamber through opening 6'.

As will be noted from FIGS. 2 to 4, prismatic bricks 7 of refractory material, which form checker works 5, 5' in chambers 4, 4' of the glass melting furnace, have an octagonal periphery and central through passage 8 of tetragonal cross section. The bricks have octagonal bottom and top surfaces and through passage 8 extends between the surfaces and is coaxial with a longitudinal axis of the brick. Four inner walls define the through passage and outer walls extend between the surfaces, the walls being parallel to the longitudinal axis. The bottom and top walls of brick 7 extend along major axes perpendicular to the longitudinal axis. One of the surfaces, i.e. the top surface in the illustrated embodiments, has elevated portions 9 and the other surface, i.e. the bottom surface in the illustrated embodiments, has corresponding or congruent depressed portions extending in the direction of the major axes. A passage, i.e. recess 11 in the bottom surface, extends from through passage 8 to a respective outer wall from all the inner walls of brick 7.

As illustrated, sharp edges parallel to the longitudinal axis of the brick are defined between the eight outer brick walls and rounded corners (see FIG. 3) parallel to the longitudinal axis connect the inner walls. Elevated portions 9 have beveled end faces 12 extending perpendicularly to the major axes and the corresponding depressed portions are defined by bottom ends of recesses 11 having congruent beveled end faces 13. This configuration greatly facilitates stacking of the bricks and locking them together in the stacked condition in the checker work. The thickness S of hollow brick 7, i.e. the distance between the inner and outer walls of the brick, is substantially constant. According to a preferred feature of this invention, the product of the length of the line delimiting passage 11 and distance S is at least equal to the area of the passage, and the area of the passage is 0.2 to 0.6 times the area of a respective inner wall.

When bricks 7 are stacked in layers (see FIGS. 3 and 4) offset or staggered relative to each other, vertical through passages are formed in the checker work, these through passages being defined in alternate layers by through passages 8 in the bricks of one layer and four major outer walls of four adjoining bricks in the other layer. Since the corners defined by the edges between the outer brick walls are sharp while the corners connecting the inner brick walls are rounded, the corner zones of the through passages in the checker work have projecting and recessed sections along the vertical extension of these through passages, and this contributes to the turbulence of the gas flow through the through passages and, therefore, improves the heat exchange between the gases and the bricks of the checker work. These projecting and recessed sections may be seen in FIG. 5 which shows only one half of some of bricks 7, for the sake of clarity.

According to the invention, the gas flow turbulence is further enhanced and a gas pressure equilibrium is created in the through passages of the checker work by providing recesses 11 in the brick walls so that the gas flows also between the through passages. This also aids in keeping all the bricks substantially at substantially the same temperature.

If desired, suitable tools may be introduced through passages 10 or 11 to remove encrustations formed on the brick walls during operation of the furnace.

What is claimed is:

1. In a checker work in chambers of a glass melting furnace, wherein the checker work is a stack of layers of prismatic bricks of refractory material, the bricks in superposed ones of the layers being staggered relative to each other: each prismatic brick having an octagonal bottom surface, an octagonal top surface, a longitudinal axis extending between the surfaces, a single through passage of tetragonal cross section between the surfaces and coaxial with the longitudinal axis, inner walls defining the through passage, outer walls between the surfaces, the walls being parallel to the longitudinal axis, the bottom and top surfaces extending along major axes, the through passage having a hydraulic diameter of 120 to 200 mm, the hydraulic diameter being defined by the relationship: four times the through passage cross section divided by the periphery of the through passage cross section, and the ratio of the hydraulic diameter to the thickness of the hollow brick, measured in the direction of the major axes being between 3 and 5, recessed passages in the bottom surface extending from the through passage to a respective one of the outer walls, the product of the length of the line delimiting each recessed passage and the distance between the inner and outer walls being at least equal to the area of the recessed passage, the top surface having elevated portions extending perpendicularly to the major axes and having beveled end faces, and the bottom surface having corresponding depressed portions defined by bottom ends of the recessed passages having congruent beveled end faces and extending in the direction of the major axes.

2. The prismatic brick of claim 1, wherein the recessed passages taper upwardly from the bottom ends thereof.

3. The prismatic brick of claim 1, having sharp edges parallel to the longitudinal axis between the outer walls.

4. The prismatic brick of claim 1, having rounded corners parallel to the longitudinal axis between the inner walls.

5. The prismatic brick of claim 1, wherein the area of each recessed passage is 0.2 to 0.6 times the area of a respective inner wall.

* * * * *